(12) United States Patent
Stephenson et al.

(10) Patent No.: US 9,267,571 B2
(45) Date of Patent: Feb. 23, 2016

(54) CABLE CONNECTOR ASSEMBLY

(71) Applicant: D B Industries, Inc., Red Wing, MN (US)

(72) Inventors: Matthew S. Stephenson, Red Wing, MN (US); John P. Blomberg, New Ulm, MN (US)

(73) Assignee: D B Industries, LLC, Red Wing, MN (US)

( * ) Notice: Subject to any disclaimer, the term of this patent is extended or adjusted under 35 U.S.C. 154(b) by 652 days.

(21) Appl. No.: 13/647,860

(22) Filed: Oct. 9, 2012

(65) Prior Publication Data

US 2013/0091690 A1  Apr. 18, 2013

Related U.S. Application Data

(60) Provisional application No. 61/546,679, filed on Oct. 13, 2011, provisional application No. 61/593,399, filed on Feb. 1, 2012, provisional application No. 61/615,061, filed on Mar. 23, 2013.

(51) Int. Cl.
| | |
|---|---|
| *F16C 11/06* | (2006.01) |
| *F16G 11/00* | (2006.01) |
| *F16G 11/08* | (2006.01) |
| *A62B 1/00* | (2006.01) |
| *A62B 35/00* | (2006.01) |

(52) U.S. Cl.
CPC . *F16G 11/00* (2013.01); *A62B 1/00* (2013.01); *A62B 35/005* (2013.01); *F16G 11/08* (2013.01); *Y10T 24/45141* (2015.01); *Y10T 29/49947* (2015.01); *Y10T 403/32032* (2015.01)

(58) Field of Classification Search
CPC ........ A62B 1/00; A62B 35/005; A41F 15/02; B25B 23/0035; B64G 1/645; F16G 11/00; F16G 11/08; F16G 15/04; Y10T 403/32032
USPC ................. 403/321, 330, 56; 24/116 R, 299
See application file for complete search history.

(56) References Cited

U.S. PATENT DOCUMENTS

| | | | | | |
|---|---|---|---|---|---|
| 2,038,469 | A | * | 4/1936 | Bannister | 474/256 |
| 2,456,182 | A | * | 12/1948 | Goble | 285/153.3 |
| 2,894,056 | A | * | 7/1959 | Bogese | 174/92 |
| 2,925,298 | A | * | 2/1960 | Robins et al. | 294/82.1 |
| 3,100,323 | A | * | 8/1963 | Baker | 403/353 |
| 3,281,906 | A | | 11/1966 | Rakel | |
| 3,825,356 | A | | 7/1974 | Crook | |
| 4,020,630 | A | * | 5/1977 | DeShetler | 59/86 |

(Continued)

FOREIGN PATENT DOCUMENTS

| | | |
|---|---|---|
| FR | 2193447 | 2/1974 |
| WO | WO 01/90598 | 11/2001 |

OTHER PUBLICATIONS

International Search Report issued in corresponding PCT application PCT/US2012/059504, 4 pages (Jan. 31, 2013).

*Primary Examiner* — Gregory Binda
*Assistant Examiner* — Nahid Amiri
(74) *Attorney, Agent, or Firm* — IPLM Group, P.A.

(57) ABSTRACT

A cable connector assembly comprises a first stop, a second stop, and a connector. The first stop is configured and arranged to receive a first end of a cable, and the second stop is configured and arranged to receive a second end of the cable. The connector is configured and arranged to pivotally interconnect the first stop and the second stop.

9 Claims, 13 Drawing Sheets

(56) References Cited

U.S. PATENT DOCUMENTS 4,151,708 A * 5/1979 Smetz ............................... 59/93
4,382,572 A * 5/1983 Thompson ..................... 248/484
5,718,216 A * 2/1998 Plattner ........................... 125/21

* cited by examiner

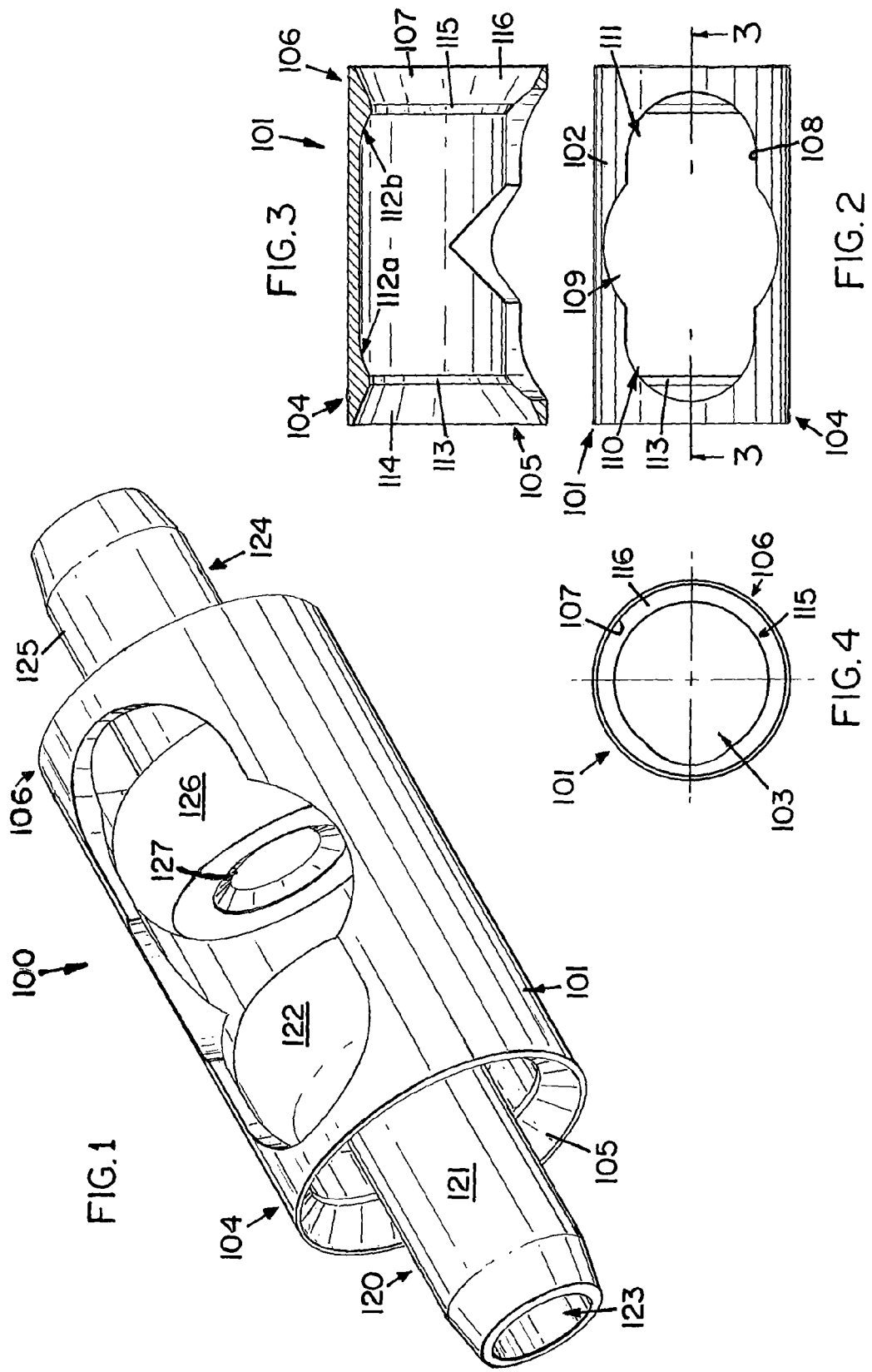

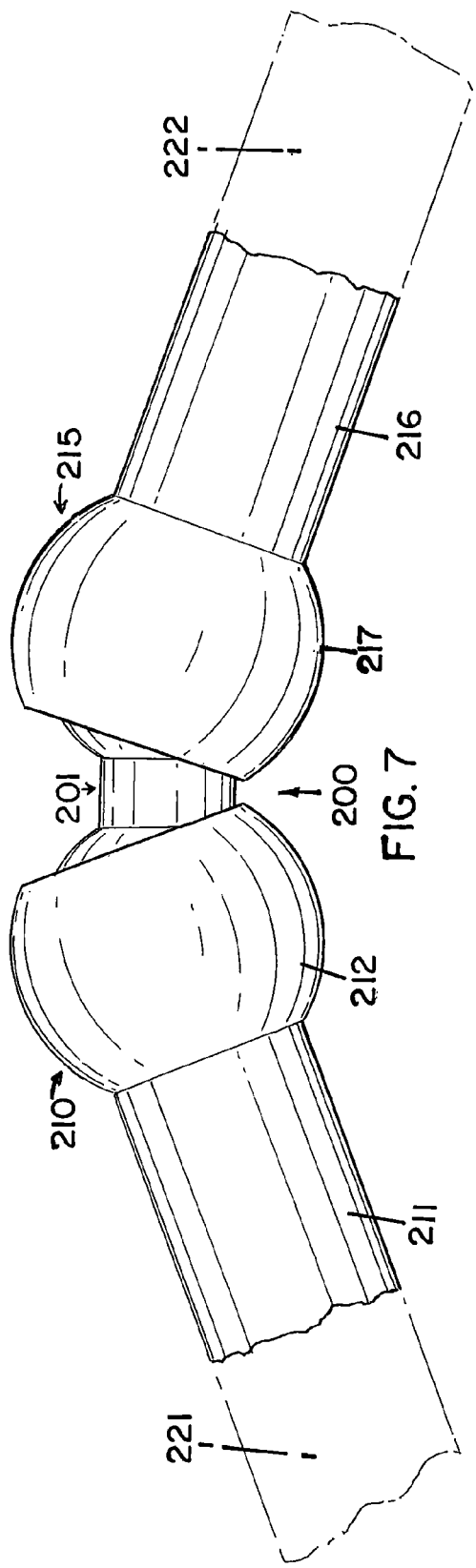
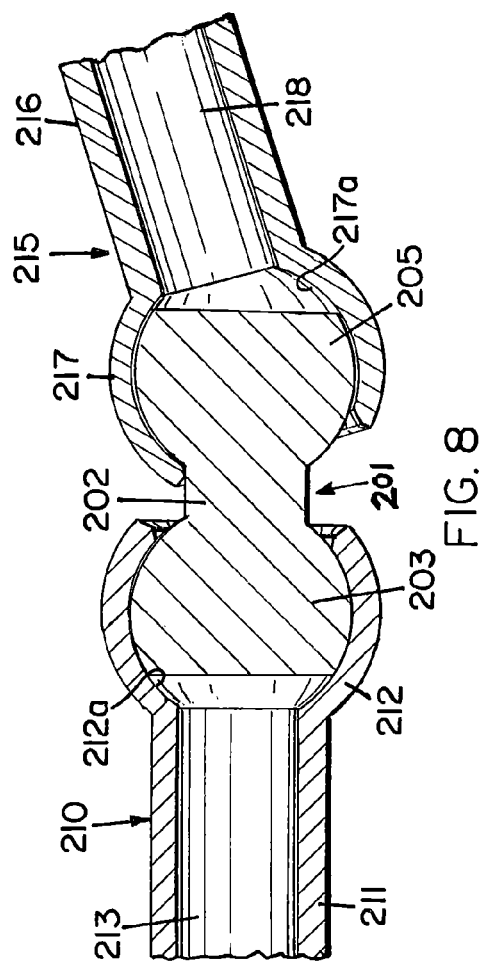

FIG. 10
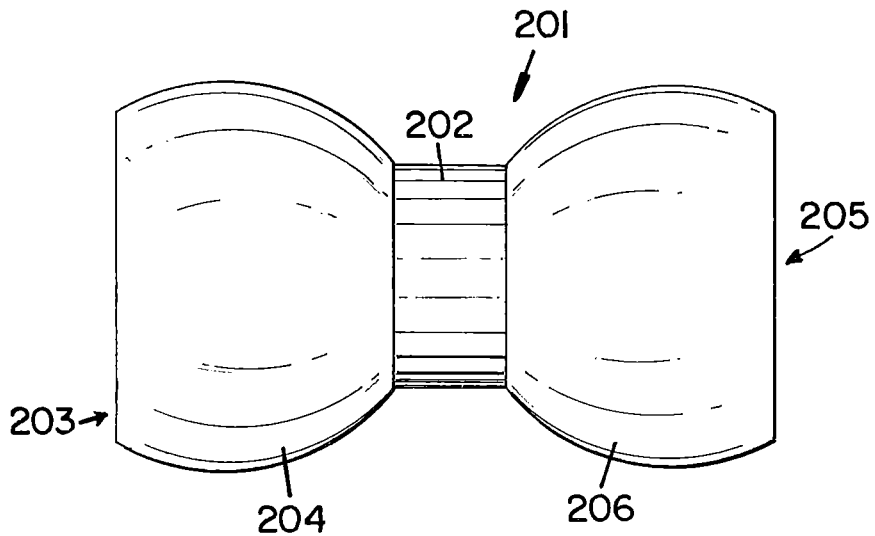
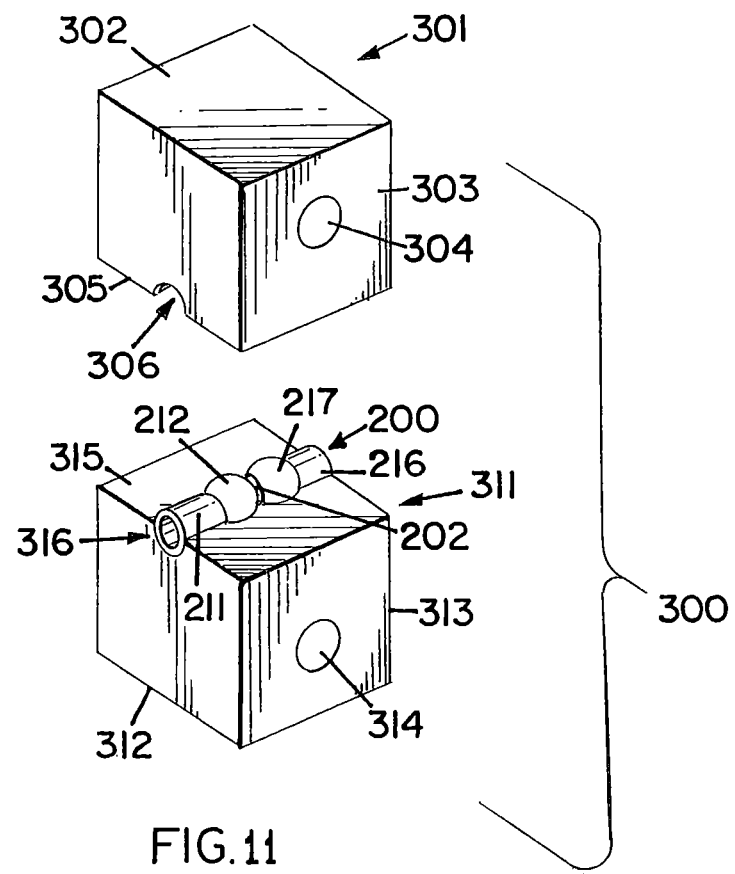
FIG. 11

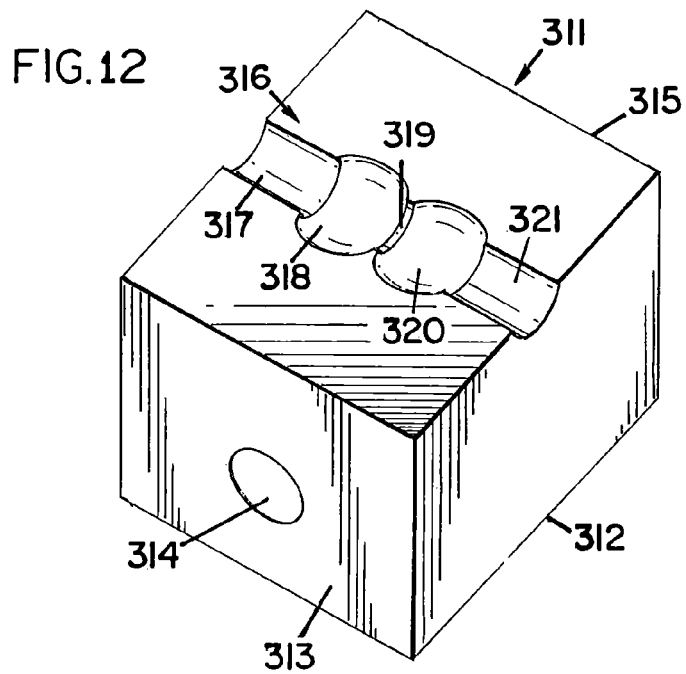
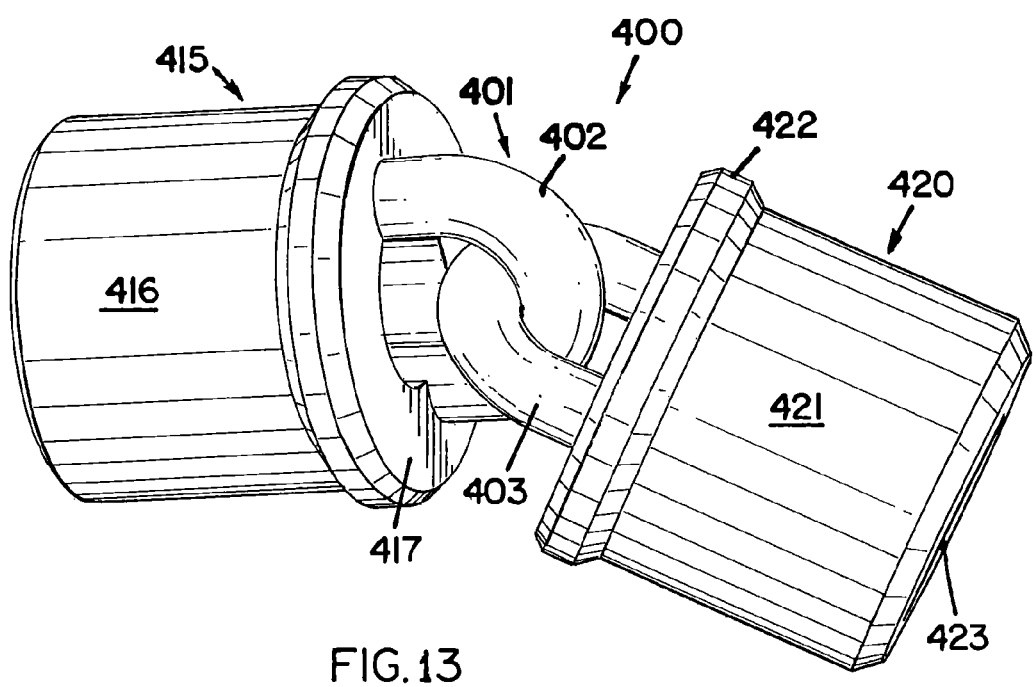

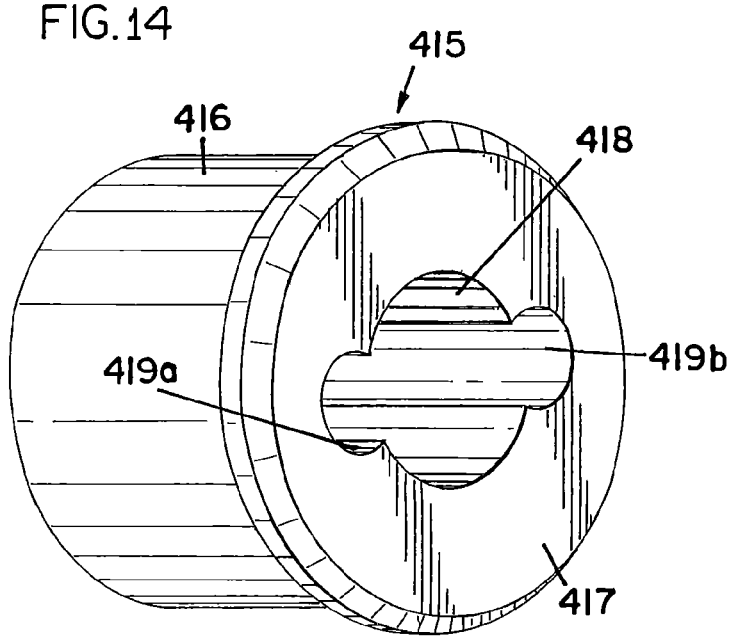
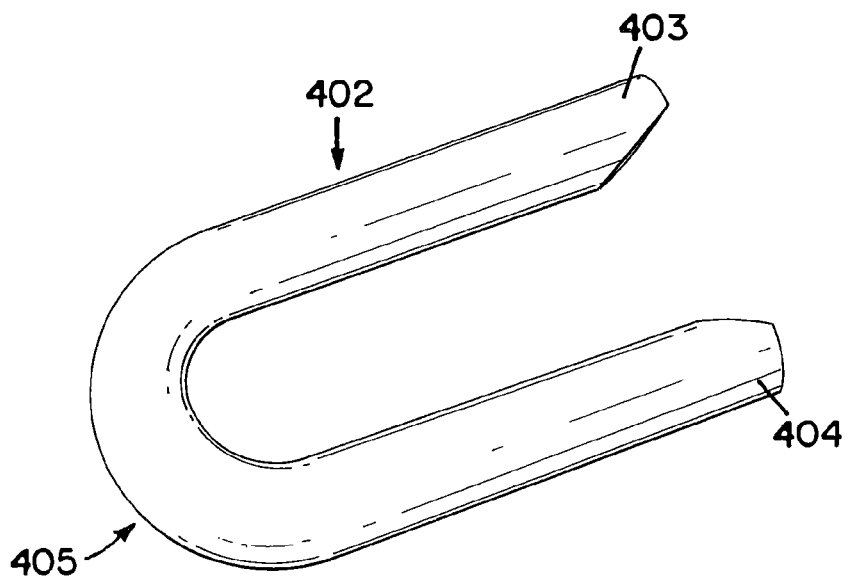

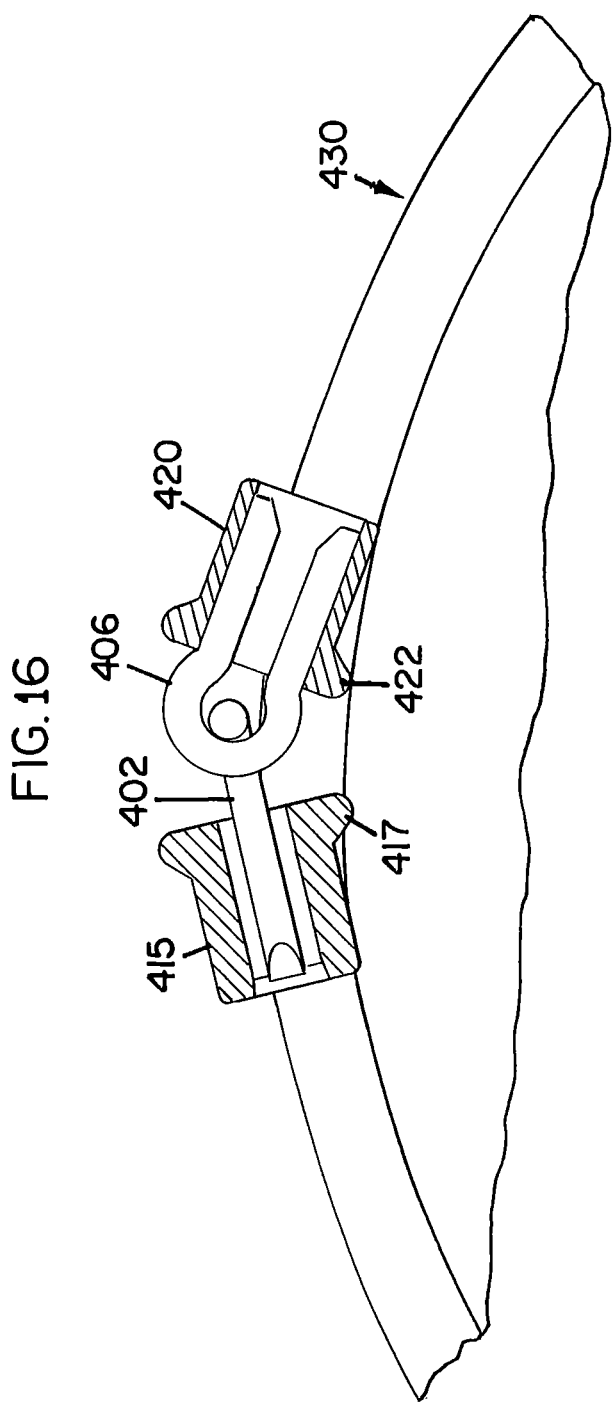

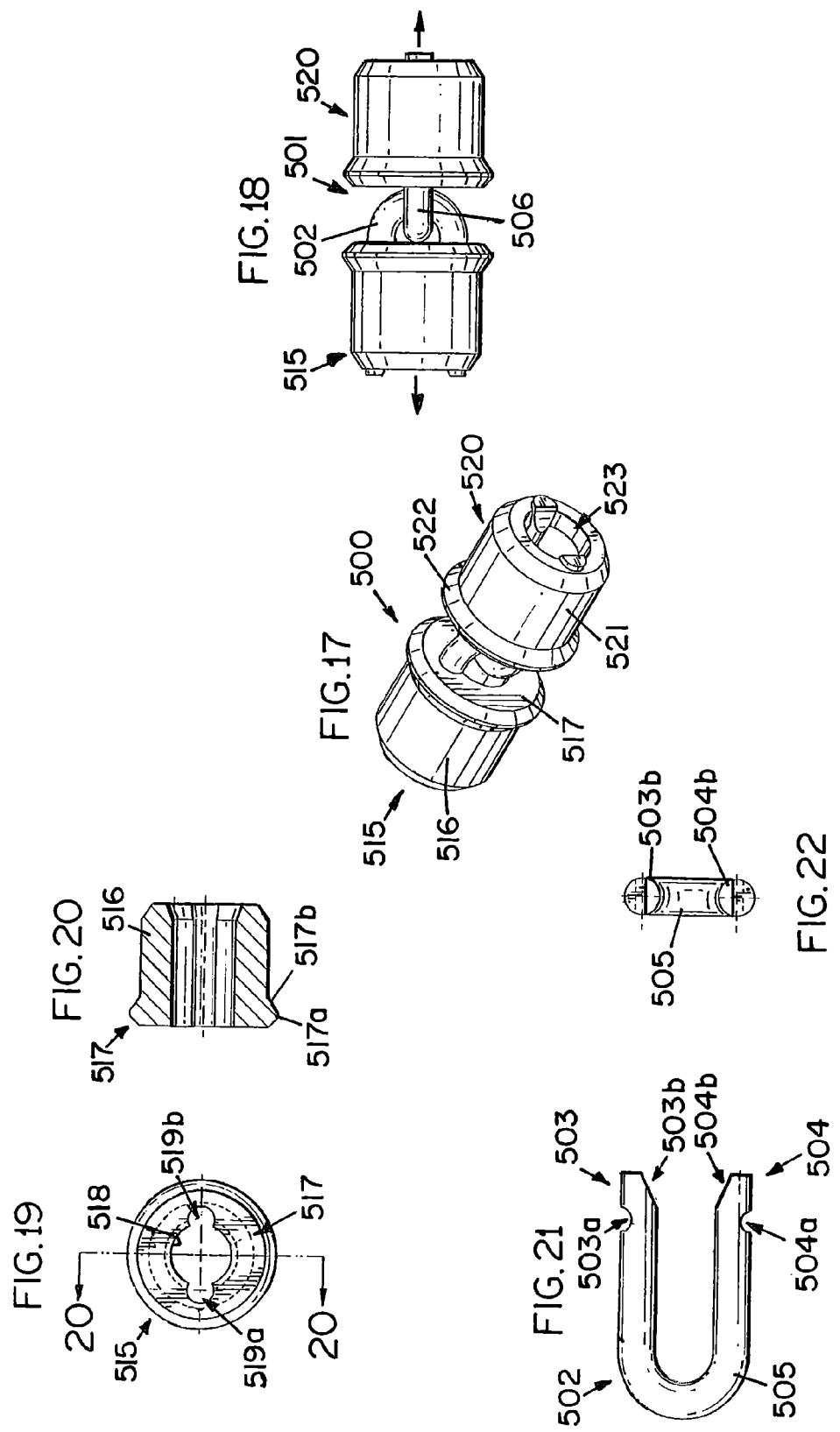

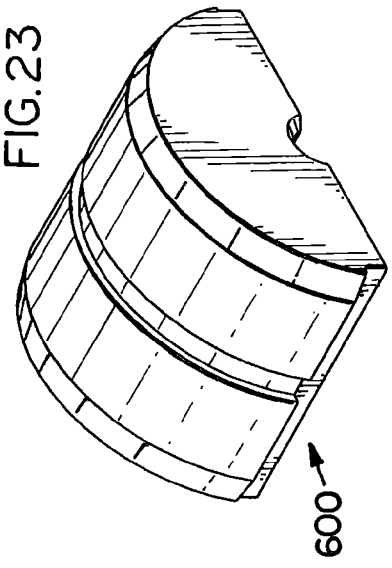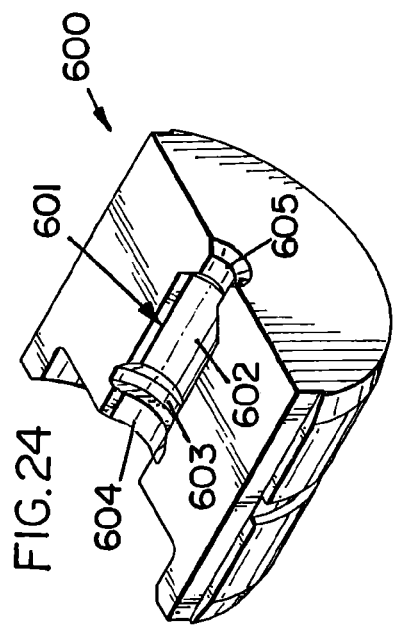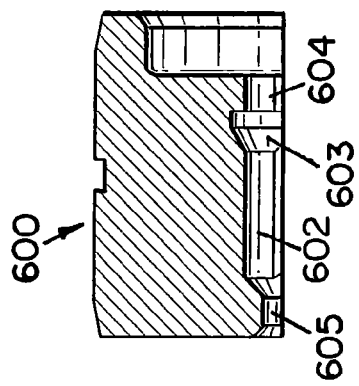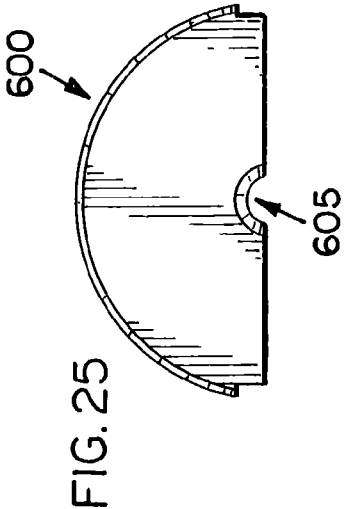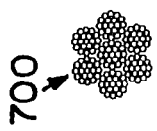

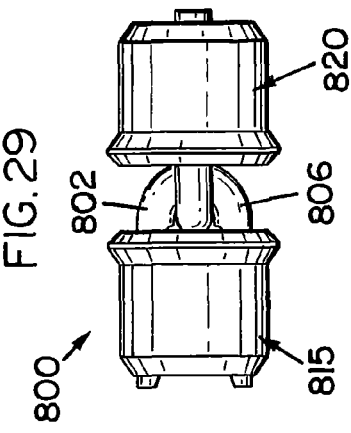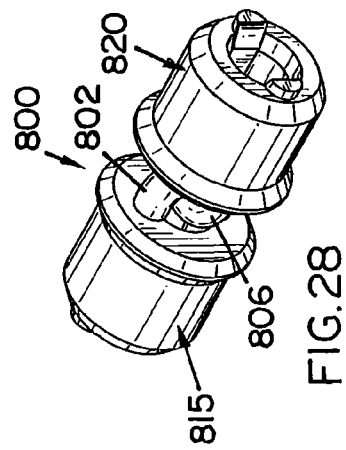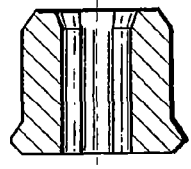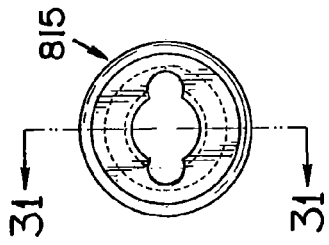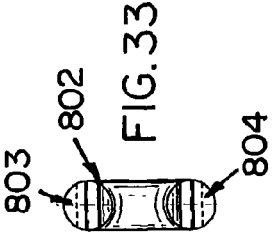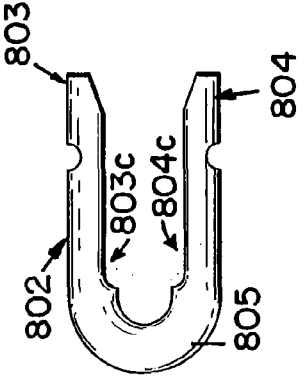

CABLE CONNECTOR ASSEMBLY

CROSS-REFERENCE TO RELATED APPLICATIONS

This application claims the benefit of U.S. Provisional Application 61/546,679 filed Oct. 13, 2011; U.S. Provisional Application 61/593,399 filed Feb. 1, 2012; and U.S. Provisional Application 61/615,061 filed Mar. 23, 2012; which are hereby incorporated by reference.

BACKGROUND OF THE INVENTION

Cables, belts, and ropes having relatively large diameters are typically used for climb assist assemblies, and these are relatively expensive. Therefore, there is a need for a less expensive option such as a cable having a relatively small diameter that can also provide flexibility in use.

For the reasons stated above and for other reasons stated below, which will become apparent to those skilled in the art upon reading and understanding the present specification, there is a need in the art for a cable connector assembly and, more particularly, a cable connector assembly for interconnecting two ends of a cable to form a continuous loop with the cable.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a cable connector assembly comprises a first stop, a second stop, and a connector. The first stop is configured and arranged to receive a first end of a cable, and the second stop is configured and arranged to receive a second end of the cable. The connector is configured and arranged to pivotally interconnect the first stop and the second stop.

In one embodiment, a cable connector assembly comprises a first stop, a second stop, and a connector including first and second connector members. The first stop includes a first base through which a first bore having a first notch and a second notch longitudinally extends. The first connector member includes a first intermediate portion interconnecting a first end and a second end. The first end is configured and arranged to fit within the first notch, and the second end is configured and arranged to fit within the second notch. The second stop includes a second base through which a second bore having a third notch and a fourth notch longitudinally extends. The second connector member includes a second intermediate portion interconnecting a third end and a fourth end. The third end is configured and arranged to fit within the third notch, and the fourth end is configured and arranged to fit within the fourth notch. The first and second connectors are configured and arranged to interconnect the first and second stops.

In one embodiment, a cable connector assembly comprises a first stop, a second stop, and a connector. The first stop includes a first base, a first circular portion, and a first bore. The second stop includes a second base, a second circular portion, and a second bore. The connector includes a third bore and an aperture in fluid communication with the third bore. The third bore has a first end and a second end. An inner surface of the connector includes a first flange and a first tapered portion proximate the first end and includes a second flange and a second tapered portion proximate the second end. The first flange is configured and arranged to support the first circular portion, the first base extends out of the connector proximate the first end, the first stop pivots proximate the first flange, and the first tapered portion allows for a greater range of pivoting motion for the first stop. The second flange is configured and arranged to support the second circular portion, the second base extends out of the connector proximate the second end, the second stop pivots proximate the second flange, and the second tapered portion allows for a greater range of pivoting motion for the second stop.

In one embodiment, a cable connector assembly comprises a first stop, a second stop, and a connector. The first stop includes a first base, a first circular portion, and a first bore. The first bore extends at least through the first base, and the first circular portion forms a first cavity. The second stop includes a second base, a second circular portion, and a second bore. The second bore extends at least through the second base, and the second circular portion forms a second cavity. The connector includes a connector base interconnecting a first connector end portion and a second connector end portion. The first cavity of the first circular portion is configured and arranged to receive the first connector end portion and the second cavity of the second circular portion is configured and arranged to receive the second connector end portion. The stops are pivotally connected to the connector, and the bores are configured and arranged to receive ends of at least one cable.

In one embodiment, a method of forming a cable connector assembly for connecting two ends of at least one cable comprises inserting a first connector end portion of a connector into a first cavity of a first stop, inserting a second connector end portion of the connector into a second cavity of a second stop, positioning the connector and the stops between a first block and a second block, and exerting pressure on the blocks to crimp the stops about the connector end portions of the connector thereby pivotally connecting the stops to the connector.

BRIEF DESCRIPTION OF THE DRAWINGS

The present invention can be more easily understood, and further advantages and uses thereof can be more readily apparent, when considered in view of the detailed description and the following Figures in which:

FIG. 1 is a perspective view of a cable connector assembly constructed according to the principles of the present invention;

FIG. 2 is a top view of a connector of the cable connector assembly shown in FIG. 1;

FIG. 3 is a cross-section view of the connector taken along the lines 3-3 in FIG. 2;

FIG. 4 is a side view of the connector shown in FIG. 2;

FIG. 7 is a perspective view of another embodiment cable connector assembly constructed according to the principles of the present invention;

FIG. 8 is a cross-section view of the cable connector assembly shown in FIG. 7;

FIG. 10 is a side view of a connector of the cable connector assembly shown in FIG. 7;

FIG. 11 is a perspective view of a crimping assembly used with the cable connector assembly shown in FIG. 7;

FIG. 12 is a perspective view of a bottom block of the crimping assembly shown in FIG. 11;

FIG. 13 is a perspective view of another embodiment cable connector assembly constructed according to the principles of the present invention;

FIG. 14 is a perspective view of a stop of the cable connector assembly shown in FIG. 13;

FIG. 15 is a perspective view of a connector of the cable connector assembly shown in FIG. 13;

FIG. 16 is a cross-section view of the cable connector assembly shown in FIG. 13 operatively connected to a portion of a pulley assembly;

FIG. 17 is a perspective view of another embodiment cable connector assembly constructed according to the principles of the present invention;

FIG. 18 is a side view of the cable connector assembly shown in FIG. 17;

FIG. 19 is a top view of a stop of the cable connector assembly shown in FIG. 17;

FIG. 20 is a cross-section view of the stop taken along the lines 20-20 in FIG. 19;

FIG. 21 is a side view of a connector member of the cable connector assembly shown in FIG. 17;

FIG. 22 is an end view of the connector member shown in FIG. 21;

FIG. 23 is an outer surface perspective view of a portion of a die for use with a crimping tool to crimp the cable connector assembly shown in FIG. 17;

FIG. 24 is an inner surface perspective view of the portion shown in FIG. 23;

FIG. 25 is an end view of the portion shown in FIG. 23;

FIG. 26 is a cross-section view of the portion shown in FIG. 23;

FIG. 27 is a cross-section view of a cable for use with the cable connector assembly shown in FIG. 17;

FIG. 28 is a perspective view of another embodiment cable connector assembly constructed according to the principles of the present invention;

FIG. 29 is a side view of the cable connector assembly shown in FIG. 28;

FIG. 30 is a top view of a stop of the cable connector assembly shown in FIG. 28;

FIG. 31 is a cross-section view of the stop taken along the lines 30-30 in FIG. 30;

FIG. 32 is a side view of a connector member of the cable connector assembly shown in FIG. 28;

FIG. 33 is an end view of the connector member shown in FIG. 32;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Figure 5:
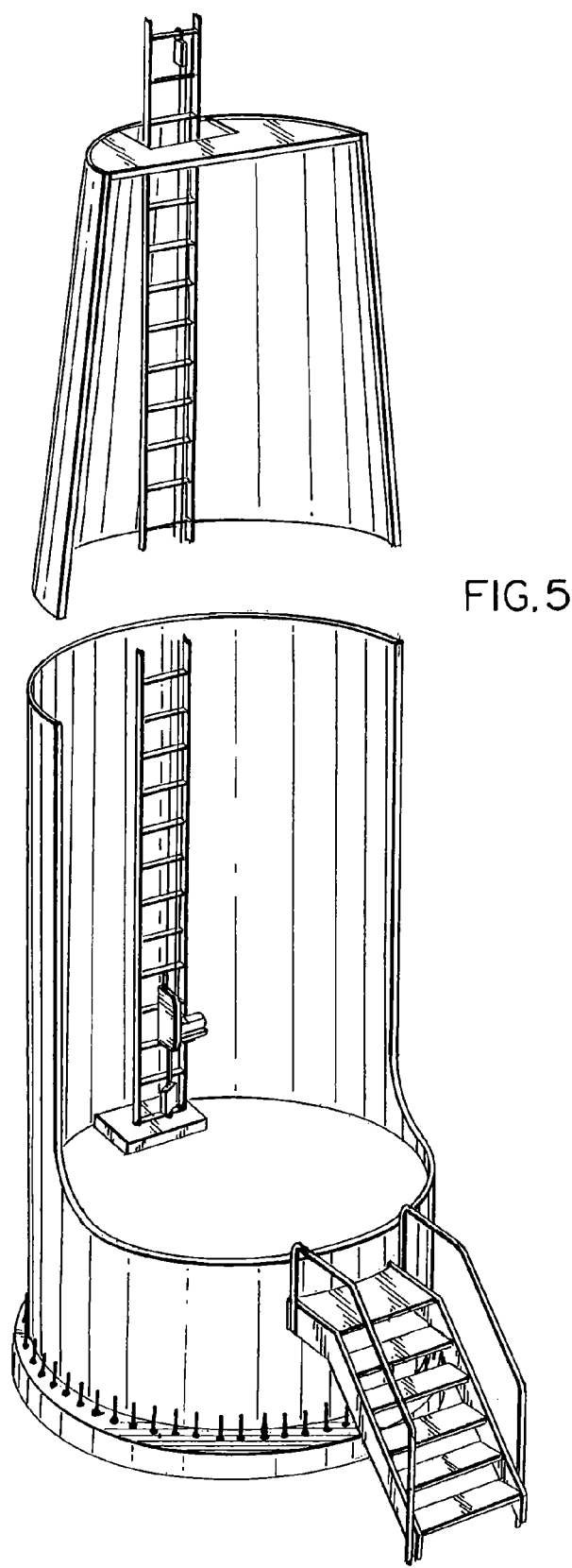
FIG. 5 is an example of a climb assist assembly with which a cable connector assembly of the present invention could be used.
Figure 6:
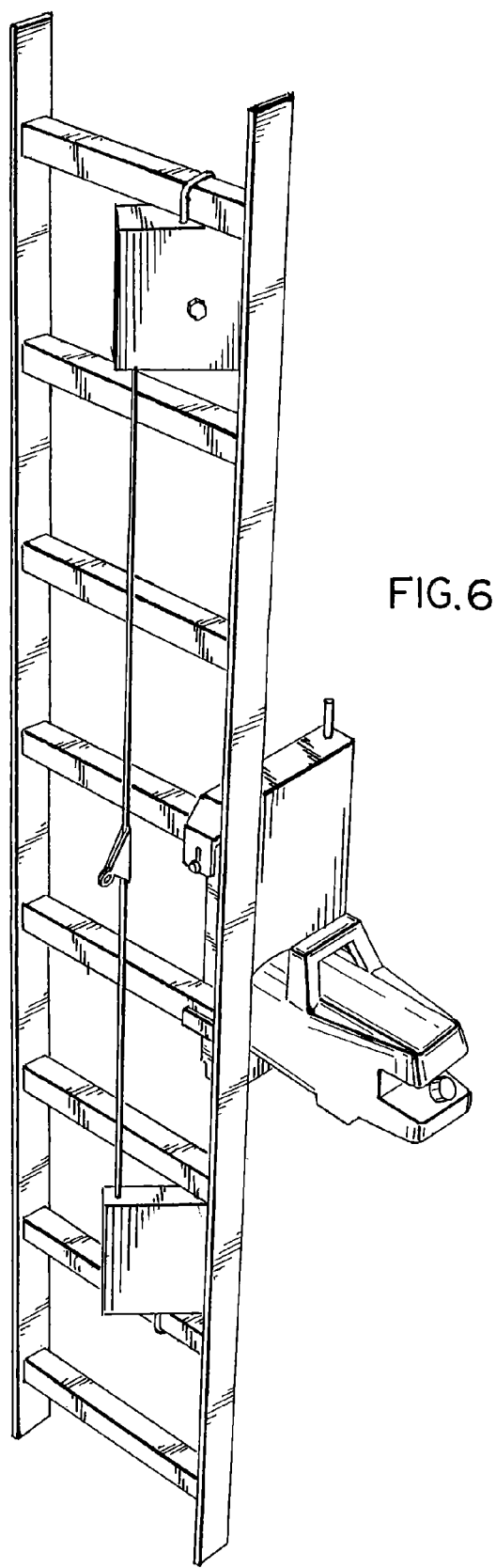
FIG. 6 is an example of another climb assist assembly with which a cable connector assembly of the present invention could be used.

Embodiments of the present invention provide a cable connector assembly for interconnecting ends of at least one cable. Connecting two ends of a cable to form a continuous loop could be used with, for example, a climb assist assembly. Examples of climb assist assemblies are shown in FIGS. 5 and 6. Connecting ends of two separate cables could be used with, for example, a self-retracting lifeline assembly, for a field replaceable lifeline. Self-retracting lifeline assemblies are well known in the art. It is recognized that the present invention could be used for other purposes and is not limited to the purposes disclosed herein.

A connector assembly 100 is shown in FIG. 1. The connector assembly 100 includes a connector 101, a first stop 120, and a second stop 124. Generally, the first stop 120 and the second stop 124 are operatively connected to the two ends of at least one cable (not shown), and the connector 101 interconnects the first and second stops 120 and 124 to interconnect the two ends of the at least one cable and form a continuous loop with the cable or operatively connect two cables.

The connector 101 includes a base 102, which is generally a cylindrical member, through which a bore 103 extends longitudinally. A first end 104 of the base 102 includes an opening 105 and a second end 106 of the base 102 includes an opening 107. A side surface of the base 102, which for ease of reference will be referred to as a top surface, includes an aperture 108 with a center portion 109, a first end portion 110, and a second end portion 111. The center portion 109 is wider than the first and second end portions 110 and 111. Generally, the first and second end portions 110 and 111 form an oval opening extending longitudinally along the top surface and the center portion 109 forms an oval opening extending laterally along the top surface and intersecting with the opening formed by the first and second end portions 110 and 111. The openings 105 and 107 and the aperture 108 provide access to the bore 103.

The inner surface of the connector 101 includes a first flange 113 proximate the first end 104. The first flange 113 extends outward toward the center of the bore 103, the first end 104 tapers inward from the end to the first flange 113 to form a tapered portion 114, and the bore 103 is radiused outward proximate the other side of the first flange 113. Thus, the tapered portion 114 and the radiused surface 112a form a flat surface, which is the first flange 113. The first flange 113 does not extend completely around the connector 101, as can be seen in FIG. 3. The first flange 113 does not extend along the top surface proximate the aperture 108.

The inner surface of the connector 101 also includes a second flange 115 proximate the second end 106. The second flange 115 is similar to the first flange 113. The second flange 115 extends outward toward the center of the bore 103, the second end 106 tapers inward from the end to the second flange 115 to form a tapered portion 116, and the bore 103 is radiused outward proximate the other side of the second flange 115. Thus, the tapered portion 116 and the radiused surface 112b form a flat surface, which is the second flange 115. The second flange 115 does not extend completely around the connector 101, as can be seen in FIG. 3. The second flange 115 does not extend along the top surface proximate the aperture 108.

The first stop 120 includes a generally cylindrical base 121, a generally circular portion 122 operatively connected to the base 121, and a bore 123 extending longitudinally through the base 121 and the circular portion 122. Similarly, the second stop 124 includes a generally cylindrical base 125, a generally circular portion 126 operatively connected to the base 125, and a bore 127 extending longitudinally through the base 125 and the circular portion 126. The first and second stops 120 and 124 are Part No. MS20664C6 manufactured by Suncor Stainless, Inc. of Plymouth, Mass.

The first stop 120 is operatively connected to the connector 101 by inserting the base 121 into the aperture 108 and then inserting the base 121 through the opening 105 of the first end 104 to position the circular portion 122 within the bore 103. The first flange 113 acts as a stop to prevent the circular portion 122 from being slid out of the bore 103 through the opening 105. Similarly, the second stop 124 is operatively connected to the connector 101 by inserting the base 125 into the aperture 108 and then inserting the base 125 though the opening 107 of the second end 106 to position the circular portion 126 within the bore 103. The second flange 115 acts as a stop to prevent the circular portion 126 from being slid out of the bore 103 through the opening 107. Each of the stops 120 and 124 can be removed from the connector 101 by moving the stop inward so that the circular portion of the stop is proximate the center portion 109 of the aperture 108, pivoting the stop so that the circular portion extends through the center portion 109, and then pulling the stop out through the aperture 108.

To interconnect the two ends of the cable, which could be performed in the field, a first end of the cable is inserted through the opening 105 of the first end 104, is inserted through the aperture 108, and then is inserted into the bore 123 of the first stop 120. The first end of the cable is then swaged to the first stop 120 by means well known in the art. The first end of the cable and the first stop 120 are then routed back into the connector 101 as described above. A second end of the cable is inserted through the opening 107 of the second end 106, is inserted through the aperture 108, and then is inserted into the bore 127 of the second stop 124. The second end of the cable is then swaged to the second stop 124 by means well known in the art. The second end of the cable and the second stop 124 are then routed back into the connector 101 as described above.

For use with a climb assist assembly, the cable could be a 3/16 inch wire cable, and a separate, supplemental fall protection assembly could be used. Alternatively, an 8 millimeter wire cable could be used, and a fall protection assembly such as, but not limited to, a cable sleeve/grab could be used with the 8 millimeter wire cable. Although cables, including wire cables, are described herein, it is recognized that other suitable cables, ropes, belts, webbing, and other suitable materials could be used with the present invention.

By interconnecting two ends of a cable, a continuous loop is formed with the cable. The continuous loop could be used in applications such as climb assist assemblies. Because it is a continuous loop, a worker could connect to the cable at any point along the assembly and move either up or down. With some prior art climb assist assemblies, the cable is not a continuous loop and, therefore, the cable must be in a specific position for a worker to connect to the cable, and the specific position depends upon whether the worker is going up or down. Thus, the present invention allows for more flexibility in use.

In addition, at least the flanges 113 and 115, the radiused inner surfaces, the aperture ends 110 and 111, and the tapered portions 114 and 116 along with the circular portions 122 and 126 allow the stops 120 and 124 to pivot relative to the connector 101 so that as the connector 101 moves through a pulley, around a drum, or moves relative to another device, the ends of the cable proximate the connector 101 pivot and less stress is placed on the cable proximate the connector 101. Thus, the cable could be used longer before it would have to be replaced.

Another connector assembly 200 is shown in FIG. 7. The connector assembly 200 includes a connector 201 configured and arranged to interconnect stops 210 and 215, each of which is operatively connected to a respective end 221 and 222 of a cable, which are shown in broken lines in FIG. 7.

As shown in FIG. 10, the connector 201 includes a base 202, which is generally cylindrical in shape, having opposing ends to which a first end portion 203 and a second end portion 205 are operatively connected. The first end portion 203 includes a rounded surface 204, and the second end portion 205 includes a rounded surface 206. Preferably, the connector 201 is an integral component made of metal, preferably steel. Although shown as a solid piece in FIG. 8, it is recognized that the connector 201 could include a bore extending longitudinally therethrough to reduce its weight.

Figure 9A:
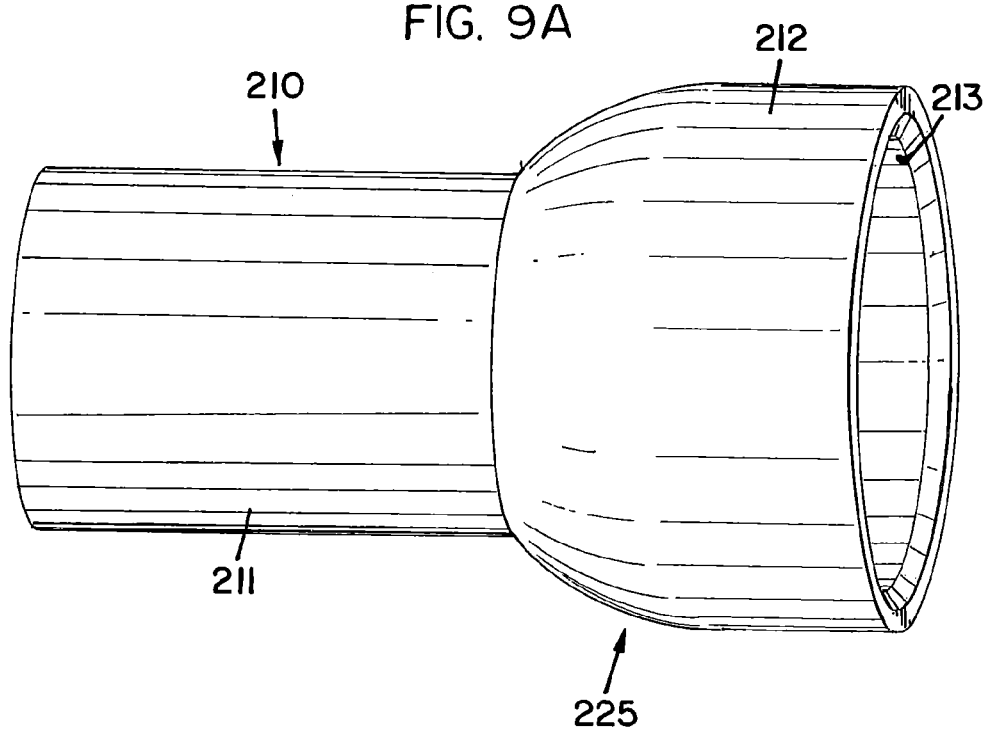
FIG. 9A is a perspective view of a stop of the cable connector assembly shown in FIG. 7 in a connecting position.
Figure 9B:
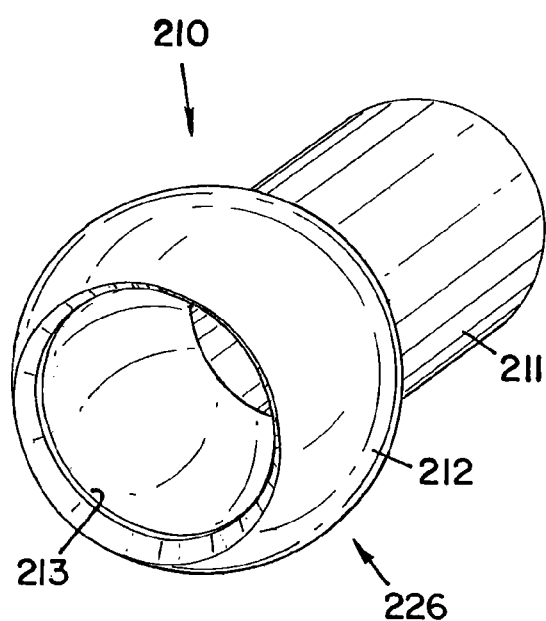
FIG. 9B is a perspective view of the stop of the cable connector assembly shown in FIG. 9A in an engaging position.
Figure 34:
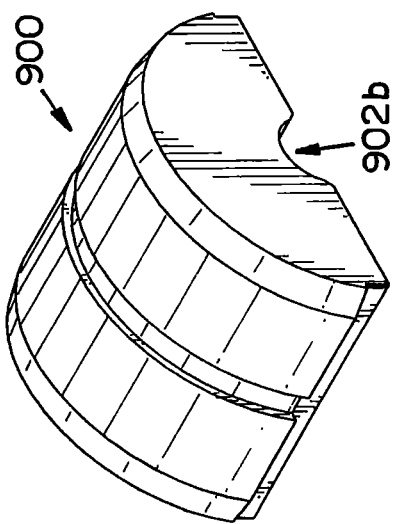
FIG. 34 is an outer surface perspective view of a portion of a die for use with a crimping tool to crimp the cable connector assembly shown in FIG. 28.
Figure 37:
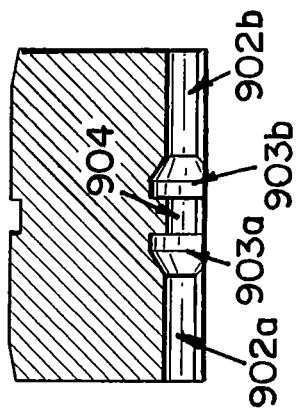
FIG. 37 is a cross-section view of the portion shown in FIG. 34.
Figure 35:
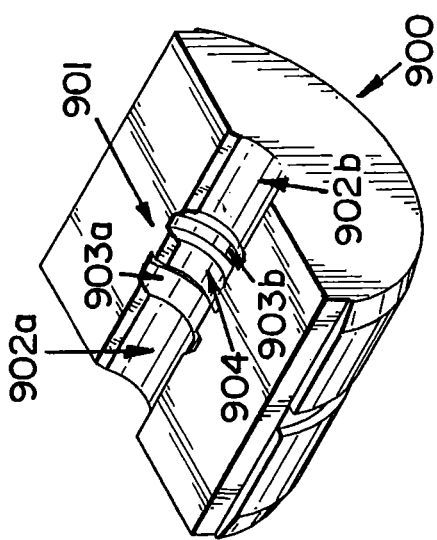
FIG. 35 is an inner surface perspective view of the portion shown in FIG. 34.
Figure 36:
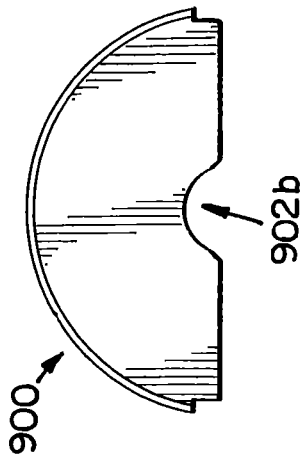
FIG. 36 is an end view of the portion shown in FIG. 34.

The first stop 210, shown in FIGS. 9A and 9B, includes a base 211 to which a circular portion 212 is operatively connected. A bore 213 extends longitudinally through the base 211 and the circular portion 212. Preferably, the first stop 210 is an integral component made of metal, preferably steel. FIG. 9A shows the first stop 210 in a connecting position 225 prior to assembly. FIG. 9B shows the first stop 210 in an engaging position 226 after assembly. In the engaging position 226, as shown in FIG. 8, the cavity 212a formed by the circular portion 212 is configured and arranged to receive the first end portion 203 of the connector 201 and the cavity 212a is formed by a radiused surface corresponding to the shape of the first end portion 203 so that the first end portion 203 can pivot relative to the circular portion 212 as shown in FIGS. 7 and 8.

The second stop 215 includes a base 216 to which a circular portion 217 is operatively connected. A bore 218 extends longitudinally through the base 216 and the circular portion 217. Preferably, the second stop 215 is an integral component made of metal, preferably steel. As shown in FIG. 8, the cavity 217a formed by the circular portion 217 is configured and arranged to receive the second end portion 205 of the connector 201. The cavity 217a is formed by a radiused surface corresponding to the shape of the second end portion 205 so that the second end portion 205 can pivot relative to the circular portion 217 as shown in FIGS. 7 and 8.

To assemble the connector assembly 200, the first end portion 203 of the connector 201 is positioned within the cavity 212a of the first stop 210 in the connecting position 225 and the second end portion 205 of the connector 201 is positioned within the cavity 217a of the second stop 215 in the connecting position, and then a crimping assembly 300 is used. In the connecting positions, the ends of the circular portions 212 and 217 are straight, not curved inward, prior to crimping. In the engaging positions, after crimping, the ends of the circular portions 212 and 217 are curved inward thereby preventing the connector 201 from becoming disconnected from the stops 210 and 215. The crimping assembly 300, shown in FIG. 11, includes a top block 301 and a bottom block 311. Preferably, the top and bottom blocks 301 and 311 are identical and, in use, are positioned as mirror images of one another. The blocks 301 and 311 crimp, bend, or form the ends of the circular portions 212 and 217 inward from the connecting positions to the engaging positions.

As shown in FIG. 11, the top block 301 is generally rectangular and includes a top 302, sides 303, and a bottom 305. A bore 304 extends through the top block 301 from two opposing sides 303. The bottom 305 includes a receiving portion 306, which is shown and described in more detail with regard to the bottom block 311. The receiving portion 306 preferably extends from opposing sides 303 adjacent the opposing sides 303 from which the bore 304 extends.

As shown in FIG. 12, the bottom block 311 is generally rectangular and includes a bottom 312, sides 313, and a top 315. A bore 314 extends through the bottom block 311 from two opposing sides. The top 315 includes a receiving portion 316, which is configured and arranged to receive a portion of the connector assembly 200. The receiving portion 316 preferably extends from opposing sides 313 adjacent the opposing sides 313 from which the bore 314 extends. The receiving portion 316 includes a base receiving portion 319 proximate the middle configured and arranged to receive a portion of the connector's base 202. Extending outward from the base receiving portion 319 toward one side 313 of the block 311 is a first circular portion receiving portion 318 and a first base receiving portion 317 configured and arranged to receive a portion of the first stop's circular portion 212 and base 211, respectively. Extending outward from the base receiving portion 319 toward an opposing side 313 of the block 311 is a second circular portion receiving portion 320 and a second base receiving portion 321 configured and arranged to receive a portion of the second stop's circular portion 217 and base 216, respectively.

In FIG. 11, the bottom block 311 is shown receiving a portion of the connector assembly 200 in its receiving portion 316. The top and bottom blocks 301 and 311 form a cavity with their respective receiving portions 306 and 316 to receive the connector assembly 200 therebetween. In other words, the connector assembly 200 is sandwiched between the top and bottom blocks 301 and 311.

The blocks 301 and 311 are mounted on a hydraulic press and the connector assembly 200 is positioned within the bottom block's receiving portion 316 as shown in FIG. 11. The blocks 301 and 311 are inserted onto threaded studs that hold them in place against the respective "jaws" of the hydraulic press. The threaded studs are perpendicular to the direction of travel during the crimping process. When force is exerted upon the blocks 301 and 311 by the hydraulic press, the blocks 301 and 311 crimp, bend, or form the circular portions or sockets 212 and 217 of the stops 210 and 215 about the rounded surfaces or ball joints 204 and 206 of the connector 201. Thus, as shown in FIGS. 7 and 8, the stops 210 and 215 can pivot relative to the connector 201 but cannot be disconnected from the connector 201 because the rounded ends of the circular portions 212 and 217 prevent the end portions 203 and 205 from sliding out of the circular portions 212 and 217.

The bases 211 and 216 of the stops 210 and 215 are swaged or crimped onto the ends of the cable(s) 221 and 222 by means well known in the art. This can be performed during field installation.

Another connector assembly 400 is shown in FIG. 13. The connector assembly 400 includes a connector 401 configured and arranged to interconnect stops 415 and 420, each of which is operatively connected to a respective end of a cable.

The connector 401 includes a first U-shaped member 402 and a second U-shaped member 406. The first U-shaped member 402 includes an intermediate portion 405, which is U-shaped, interconnecting a first end 403 and a second end 404. The first U-shaped member 402 is shown in FIG. 15. The second U-shaped member 406 is similar to the first U-shaped member 402 and includes an intermediate portion, which is U-shaped, interconnecting a first end and a second end.

A first stop 415 includes a base 416, which is generally cylindrical in shape, to which a flanged portion 417 is operatively connected. A bore 418 extends longitudinally through the base 416 and the flanged portion 417, and the bore 418 includes opposing notches 419a and 419b. A second stop 420 includes a base 421, which is generally cylindrical in shape, to which a flanged portion 422 is operatively connected. A bore 423 extends longitudinally through the base 421 and the flanged portion 422, and the bore 423 includes opposing notches (not shown).

The connector assembly 400 is assembled as shown in FIG. 13. The intermediate portions of the U-shaped members 402 and 406 are linked and then the ends are inserted into respective notches of the respective stops. With regard to the first U-shaped member 402, the first end 403 is inserted into the notch 419a and the second end 404 is inserted into the notch 419b of the first stop 415. With regard to the second U-shaped member 406, the first end is inserted into the respective notch and the second end is inserted into the respective notch of the second stop 420. The U-shaped members are frictionally held in place within the notches.

To connect ends of at least one cable to the connector assembly 400, a first cable end is inserted into the bore 418 of the first stop 415 and a second cable end is inserted into the bore 423 of the second stop 420. The ends of the at least one cable are secured to the stops using a crimping technique well known in the art. This crimping technique also secures the U-shaped members to the respective stops.

In use, the connector 401, which includes the U-shaped members 402 and 406, allows the cable connection to bend as it moves around a pulley assembly 430, and this reduces the amount of stress placed on the cable connection. The flanged portions 417 and 422 cause the respective stops 415 and 420 to tilt at angles relative to the pulley assembly 430, which allows the cable to come straight out of the stops 415 and 420 tangent to the pulley assembly 430, thus reducing bending of the cable proximate the cable connection, as shown in FIG. 16.

Another connector assembly 500 is shown in FIGS. 17 and 18. The connector assembly 500 includes a connector 501 configured and arranged to interconnect stops 515 and 520, each of which is operatively connected to a respective end of a cable.

The connector 501 includes a first U-shaped member 502 and a second U-shaped member 506. The first U-shaped member 502 includes an intermediate portion 505, which is U-shaped, interconnecting a first end 503 and a second end 504. The first end 503 includes a notched portion 503a proximate its outer surface and a tapered portion 503b proximate its inner surface. The second end 504 includes a notched portion 504a proximate its outer surface and a tapered portion 504b proximate its inner surface. The tapered portions 503b and 504b could be tapered approximately 25 degrees. The first U-shaped member 502 is shown in FIGS. 21 and 22. The second U-shaped member 506 is similar to the first U-shaped member 502 and includes an intermediate portion, which is U-shaped, interconnecting a first end and a second end.

A first stop 515 includes a base 516, which is generally cylindrical in shape, to which a flanged portion 517 is operatively connected. The first stop 515 is shown in FIGS. 19 and 20. The flanged portion 517 includes a first tapered surface 517a proximate its top and a second tapered surface 517b proximate its bottom. The first tapered surface 517a could be tapered approximately 45 degrees, and the second tapered surface 517b could be tapered approximately 55 degrees. A bore 518 extends longitudinally through the base 516 and the flanged portion 517, and the bore 518 includes opposing notches 519a and 519b. The bottom of the base 516 could be chamfered approximately 55 degrees proximate its outer surface and approximately 70 degrees proximate its inner surface.

A second stop 520 includes a base 521, which is generally cylindrical in shape, to which a flanged portion 522 is operatively connected. The flanged portion 522 includes tapered surfaces. A bore 523 extends longitudinally through the base 521 and the flanged portion 522, and the bore 523 includes opposing notches (not shown). The bottom of the base 521 could be chamfered. The second stop 520 is similarly constructed as the first stop 515.

The connector assembly 500 is assembled as shown in FIGS. 17 and 18. The intermediate portions of the U-shaped members 502 and 506 are linked and then the ends are inserted into respective notches of the respective stops. With regard to the first U-shaped member 502, the first end 503 is inserted into the notch 519a and the second end 504 is inserted into the notch 519b of the first stop 515. With regard to the second U-shaped member 506, the first end is inserted into the respective notch and the second end is inserted into the respective notch of the second stop 520. The U-shaped members are frictionally held in place within the notches.

To connect ends of at least one cable to the connector assembly 500, a first cable end is inserted into the bore 518 of the first stop 515 and a second cable end is inserted into the bore 523 of the second stop 520. The ends of the at least one cable are secured to the stops using a crimping technique well known in the art. This crimping technique also secures the U-shaped members to the respective stops. During the crimping, the stops are deformed so that portions of the stops are positioned within the notched portions of the U-shaped members and so that the ends of the at least one cable are secured to the stops.

An example of a portion 600 of a die that could be used with a crimping tool, which is well known in the art, is shown in FIGS. 23-26. The portion 600 of the die includes a receiving portion 601 having a base receiving portion 602 and a flange receiving portion 603 configured and arranged to receive the base and the flanged portion of one of the stops 515 and 520, a connector receiving portion 604 configured and arranged to receive one of the connectors 502 and 506, and a cable receiving portion 605 configured and arranged to receive one of the ends of the at least one cable. The stop, the connector, and the end of the cable are inserted between two portions and then pressure is applied by the crimping tool to perform the crimping technique. In this embodiment, each stop is crimped separately.

An example of a cable 700 is shown in FIG. 27. The cable 700 is preferably a galvanized wire rope with a diameter of approximately 3/16 inch, 7 by 19 strand, and a minimum breaking strength of 4,200 pounds.

In use, the connector 501, which includes the U-shaped members 502 and 506, allows the cable connection to bend as it moves around a pulley assembly (not shown), and this reduces the amount of stress placed on the cable connection. The flanged portions 517 and 522 cause the respective stops 515 and 520 to tilt at angles relative to the pulley assembly, which allows the cable to come straight out of the stops 515 and 520 tangent to the pulley assembly, thus reducing bending of the cable proximate the cable connection.

Another connector assembly 800 is shown in FIGS. 28 and 29. The connector assembly 800 is similar to the connector assembly 500 and, therefore, only the significant differences will be described.

The connector assembly 800 includes stops 815 and 820, which are similar to stops 515 and 520, and connectors 802 and 806, which are different than connectors 502 and 506. Stop 815 is shown in FIGS. 30 and 31, and connector 802 is shown in FIGS. 32 and 33. The connectors 802 and 806 include material removed from the inner surfaces of the ends so that the ends are thinner relative to the intermediate portion 805 and the ends of the cable may be inserted easier between the ends of the connectors. As shown in FIGS. 32 and 33, the connector 802 includes an inner surface 803c proximate the first end 803 and an inner surface 804c proximate the second end 804.

An example of a portion 900 of a die that could be used with a crimping tool, which is well known in the art, for crimping the connector assembly 800 is shown in FIGS. 34-37. The portion 900 of the die includes a receiving portion 901 having base receiving portions 902a and 902b and flange receiving portions 903a and 903b configured and arranged to receive the bases and the flanged portions of the stops 815 and 820 and a connector receiving portion 904 configured and arranged to receive the connectors 802 and 806. The stops and the connectors are inserted between two portions 900 and then pressure is applied by the crimping tool to perform the crimping technique. In this embodiment, both stops are crimped simultaneously.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A cable connector assembly, comprising:
a first stop configured and arranged to receive a first end of a cable, the first stop including a first base through which a first bore longitudinally extends, the first base having a first notch and a second notch in fluid communication with the first bore;
a second stop configured and arranged to receive a second end of the cable, the second stop including a second base through which a second bore longitudinally extends, the second base having a third notch and a fourth notch in fluid communication with the second bore;
a connector configured and arranged to pivotally interconnect the first stop and the second stop, the connector including a first connector member and a second connector member, the first connector member including a first intermediate portion interconnecting a first end and a second end, the first end of the first connector member being configured and arranged to fit within the first notch, the second end of the first connector member being configured and arranged to fit within the second notch, the second connector member including a second intermediate portion interconnecting a third end and a fourth end, the third end of the second connector member being configured and arranged to fit within the third notch, the fourth end of the second connector member being configured and arranged to fit within the fourth notch; and the first and second connector members being configured and arranged to interconnect the first and second stops.

2. The cable connector assembly of claim 1, wherein the first and second connector members are U-shaped members configured and arranged to be linked proximate the intermediate portions.

3. The cable connector assembly of claim 1, wherein the first stop includes a first flanged portion configured and arranged to cause the first stop to tilt at an angle when routed through a pulley assembly.

4. The cable connector assembly of claim 1, wherein the ends of the connector members are crimped to engage the respective stop.

5. A cable connector assembly, comprising:

a first stop configured and arranged to receive a first end of a cable, the first stop including a first base, a first circular portion, and a first bore;

a second stop configured and arranged to receive a second end of the cable, the second stop including a second base, a second circular portion, and a second bore;

a connector configured and arranged to pivotally interconnect the first stop and the second stop, the connector including a third bore and an aperture in fluid communication with the third bore, the third bore having a first end and a second end, an inner surface including a first flange and a first tapered portion proximate the first end and including a second flange and a second tapered portion proximate the second end;

wherein the first flange is configured and arranged to support the first circular portion, the first base extends out of the connector proximate the first end, the first stop pivots proximate the first flange, and the first tapered portion allows for a greater range of pivoting motion for the first stop; and wherein the second flange is configured and arranged to support the second circular portion, the second base extends out of the connector proximate the second end, the second stop pivots proximate the second flange, and the second tapered portion allows for a greater range of pivoting motion for the second stop.

6. The cable connector assembly of claim 5, wherein the inner surface further includes radiused surfaces proximate the first and second flanges and proximate the first and second circular portions.

7. A cable connector assembly, comprising:

a first stop including a first base through which a first bore longitudinally extends, the first base having a first notch and a second notch in fluid communication with the first bore;

a first connector member including a first intermediate portion interconnecting a first end and a second end, the first end being configured and arranged to fit within the first notch, the second end being configured and arranged to fit within the second notch;

a second stop including a second base through which a second bore longitudinally extends, the second base having a third notch and a fourth notch in fluid communication with the second bore;

a second connector member including a second intermediate portion interconnecting a third end and a fourth end, the third end being configured and arranged to fit within the third notch, the fourth end being configured and arranged to fit within the fourth notch; and the first and second connectors being U-shaped members configured and arranged to be linked proximate the intermediate portions and interconnect the first and second stops.

8. The cable connector assembly of claim 7, wherein the first stop includes a first flanged portion configured and arranged to cause the first stop to tilt at an angle when routed through a pulley assembly.

9. The cable connector assembly of claim 7, wherein the ends of the connector members are crimped to engage the respective stop.

* * * * *